United States Patent [19]

Heijnen et al.

[11] Patent Number: 4,618,418
[45] Date of Patent: Oct. 21, 1986

[54] FLUIDIZED BED REACTOR

[75] Inventors: Joseph J. Heijnen, Rijen; Pieter A. Lourens; Albertus J. Vixseboxse, both of Delft, all of Netherlands

[73] Assignee: Gist-Brocades N.V., Delft, Netherlands

[21] Appl. No.: 685,220

[22] Filed: Dec. 26, 1984

Related U.S. Application Data

[63] Continuation of Ser. No. 479,200, Mar. 28, 1983, abandoned.

[30] Foreign Application Priority Data

Mar. 29, 1982 [NL] Netherlands .......................... 8201293

[51] Int. Cl.$^4$ ............................................. C02F 3/28
[52] U.S. Cl. ..................................... 210/151; 210/188;
210/218; 210/289; 210/291; 210/539; 422/140;
422/144; 422/147
[58] Field of Search ............... 210/150, 151, 188, 218,
210/289, 291, 539, 661, 702, 737; 422/140, 144,
147

[56] References Cited

U.S. PATENT DOCUMENTS

| | | | |
|---|---|---|---|
| 2,613,181 | 10/1952 | Groen et al. | 210/661 |
| 3,371,033 | 2/1968 | Simmons et al. | 210/150 |
| 3,847,805 | 11/1974 | Voedisch | 210/279 |
| 3,901,660 | 8/1975 | Ohorodnik | 422/140 |
| 4,202,774 | 5/1980 | Kos | 210/274 |
| 4,411,780 | 10/1983 | Suzuki et al. | 210/150 |
| 4,490,258 | 12/1984 | Heijen et al. | 210/617 |

FOREIGN PATENT DOCUMENTS

| | | | |
|---|---|---|---|
| 0007849 | 2/1980 | European Pat. Off. | |
| 0105850 | 8/1979 | Japan | 210/617 |
| 2023122 | 12/1979 | United Kingdom | |
| 2082164 | 3/1982 | United Kingdom | 210/617 |

Primary Examiner—David L. Lacey
Attorney, Agent, or Firm—Bierman, Peroff & Muserlian

[57] ABSTRACT

A single unit fluidized-bed reactor having a reaction space for purification of waste water with biomass attached to carrier particles, comprising a liquid distribution device above the bottom of the reaction space particularly suited for introduction of waste water in wide reactors to achieve uniform fluidization therein, said device consisting of a number of substantially horizontal pipes, each having in the under-surface a number of regularly distributed openings for downward introduction of the liquid, and on top of the reaction space united therewith a multifunctional separation compartment for complete separation of the gas-liquid-solids mixture leaving the reaction space and for complete return of attached biomass into the reaction space, the separation compartment being construction so as to handle treatments involving large or small gas fractions in reactors of varying width.

20 Claims, 8 Drawing Figures

LIQUID DISTRIBUTION DEVICE

FLUIDIZED BED REACTOR

PRIOR APPLICATION

This application is a continuation of copending U.S. patent application Ser. No. 459,200 filed Mar. 28, 1983, now abandoned.

STATE OF THE ART

In recent years, fluidized-bed reactors for purification of waste waters have become increasingly important because they entail the occupation of less space and a more efficient control of the biological conversions as compared with older methods such as the trickle filter method and activated sludge systems. In reactors of this kind, carrier particles of a diameter of about 0.1 to 3 mm, overgrown with biomass suitably selected for one of the known biological decomposition or conversion processes, are brought to fluidition and kept in that state of suspension by an upward-directed flow of liquid containing nutrients for the microorganisms of the attached biomass which stay alive and/or multiply by consumption and conversion of the nutrients provided.

Within the realm of waste water purification, important processes which can be carried out in fluidized-bed reactors are aerobic processes, i.e. aerobic removal of COD and nitrification, as well as anaerobic processes, i.e. denitrification and methane-generating anaerobic removal of COD, which latter process can be performed in one step or—often advantageously—in two consecutive steps namely an acetogenic step yielding lower fatty acids and a methanogenic step wherein the fatty acids are converted into methane together with a smaller amount of carbon dioxide. Although the advantages of the fluidized-bed method have been recognized and established, this does not mean that there are no problems and difficulties associated with the desired practical continuous operation of the biological fluidized-bed process, particularly with respect to the present prevailing demands for high space loads of conversion. In fact such problems are large and diverse.

One of the said problems is similar to a problem already encountered in an older and still much used purification method wherein attachment of microorganisms only occurred to each other in microbial flocks and to the walls and other parts of the reactor so that it is in practice far from easy to reach continuous separation of gas and microorganisms from treated waste water in an effective way. For those processes with an usually relatively low level of conversion, thereby associated with a relatively low gas fraction and a relatively low concentration of biomass, it has been suggested sometimes such as German Pat. No. 736284, to try out chemical reactors or close adaptions thereof of relatively simple construction. As proved in practice, it is in those suggestions often ignored that living solids like aggregates of microorganisms which are light in weight and are of continuously varying dimensions, particularly when pertaining to collections of various different microorganisms, as usually employed in waste water purifications, may behave quite differently as compared with easily separable and usually much heavier chemical solids (e.g. insoluble catalysts) of practically constant dimensions. But even if somehow microorganisms could be forced to behave more like dead solids, as is to some extent the case with biomass attached to small-sized carrier particles, a significant relative increase in the amounts of solids and gas, as prevailing in modern waste water purification processes, employing for instance hundreds of grams per liter of solids in the form of biomass attached to carrier particles, leads to a situation which is not easily solved by application of existing chemical reactor designs, let alone the circumstance that large industrial chemical reactors intended for dealing with mixtures of liquid with large fractions of gas and solid are very rare or presently do not exist at all.

Another but related problem which relates particularly to occupation of space concerns the relative size of the equipment used to separate biomass from liquid treated biologically. Whether or not the separation equipment is kept apart from the reaction space, or is placed on top of the reaction space, or is even integrated with the reaction space, as by Dutch Patent Application No. 148,112, it was apparently usually not possible, as is shown nicely by the drawing in this application cited, to use a separation compartment which is smaller in size compared with the reaction space.

Specifically with respect to the use of the fluidized-bed method for the purification of waste waters, various more or less typical problems impeding a continuous performance in practice were encountered in the development of industrial waste water treatment reactors meeting the present economical and environmental requirements. The multiplication of microorganisms attaching to carrier particles could not be kept in hand so that the resulting overgrown particles became so light in weight that they were simply swept away from the reaction space. An often simultaneously occurring disturbance of the fluidized-bed originated from clotting together of overgrown particles.

It is usually difficult to maintain uniform fluidization over the entire cross section of fluidized-bed reactors. That this problem is still experienced today is indicated by Flaschel et al. in Chemie Ingenieur Technik, Vol. 54, p. 54 (1982) and by Cooper et al. in "Biological fluidized-bed treatment of water and waste-water" (Ellis Horwood Limited, pages 59, 303, 304 (1982)). It remains far from simple to generate and maintain firm attachment of bio-layers resistant to the motions in the fluidized-bed to a carrier.

The bio-layers are knocked loose by gas bubbles resulting form the supply of gas necessary in aerobic processes or by the turbulent shear forces created near the liquid distribution device. Even if the bio-layers attached to carrier particles are grown in the right thickness, it is usually not possible to prevent entirely washout of attached biomass so that provisions are needed to separate carrier particles with attached biomass from liquid treated and to return the overgrown particles to the reaction space.

In the mean time, solutions have been proposed for the majority of these problems, but unfortunately these solutions usually implicate additional aids and appliances, and expensive reactor constructions as well. For instance, it has been suggested in U.S. Pat. Nos. 4,009,099, 4,182,675, and 4,177,144 to strip off too thick bio-layers from carrier particles by mounting an additional stirring device in the reaction space. When using the stirrer, sufficiently large shear forces are generated to strip off the bio-layers at least in part. As an alternative, it is according to those patents also possible to remove regularly by pumping too much overgrown particles, followed by mechanical abrasion in a separate installation whereupon the naked carrier particles are fed back into the reaction space by pumping.

Complicated liquid distribution devices have been developed to effect uniform fluidization in the absence of turbulent shear forces near the liquid distributor. An example thereof can be found in U.S. Pat. No. 4,202,774 wherein the velocity field of the incoming liquid flow is guided to give a laminar flow just above the liquid distribution system to enable regrowth of bio-layers on bare particles resulting from abrasion in the top of the fluidized-bed or in a separate installation as described in U.S. Pat. No. 4,009,099 and the like. As alleged in U.S. Pat. No. 4,202, 774, laminar flow provided for by such sophisticated liquid distribution systems make it possible to apply on an industrial scale the purification methods described in, for instance, U.S. Pat. No. 4,009,099.

According to U.S. Pat. No. 4,032,407, the nondesired generation of gas bubbles in processes accompanied by simultaneous introduction of gas, generally air or pure oxygen, can be prevented by previous dissolution of the gas in the liquid under pressure. In view of this feature too, it is apparently also sometimes preferred to use more expensive pure oxygen in place of air for processes requiring large amounts of oxygen, such as nitrification.

According to U.S. Pat. No. 4,032,407, it is possible to diminish substantially wash-out of overgrown carrier particles by employing a cone-shaped reactor which increases in width from an inlet end to an outlet end. Alternatively, liquid treated and particles washed out are separated outside the reactor in a settling installation followed by feed-back of the particles into the reactor according to a lecture of Oppelt et al, i.e. "US-EPA-research and current thinking of fluidized-bed biological treatment" (held in Manchester 1978 during the Congress on Biological fluidized-bed treatment of water and waste water).

It is clear that solutions of this nature complicate installations for the execution of biological processes in fluidized-bed reactors while they also require considerably more surveillance. Obviously, there still exists a need for more simple installation and more simple means to be able to maintain a stable workable process. U.S. Pat. No. 4,490,258 and in particular U.S. Pat. No. 4,560,479 appear to contain the hitherto best proposals to obtain stable bio-layers on carrier particles and to maintain a workable process without undue occurrence of problems associated with excessive accretion of biomass. However, for an economical, large scale industrial application, a decisive solution is as yet not disclosed for one fourfold problem residing in the substantially complete prevention of wash-out of overgrown carrier particles from the reactor by treated liquid leaving the reaction space in combination with adequate separation of liquid from solid and complete return of overgrown carrier particles into the reaction space, and in combination with a simple liquid distribution device enabling uniform fluidization without abrasion of bio-layers.

Although it is true that it has been indicated in a schematic manner U.S. Pat. No. 4,490,258 and U.S. Pat. No. 4,560,479 that it is possible in principle to apply a system, wherein a reaction space containing the fluidized-bed with a settling zone on top provided with a weir for the treated liquid and a discharge for remaining gas or for gas generated during the biological conversion are combined into one closed unit, a technologically workable application form thereof for in particular use on industrial scale was not disclosed therein since a number of difficult problems subsequently had to be solved as will be appreciated by people skilled in the art.

OBJECTS OF THE INVENTION

It is an object of the invention to provide a fluidized-bed reactor wherein biological purification processes are effected on an industrial scale.

It is another object of the invention to provide a single unit fluidized-bed reactor for purification of waste water with biomass attached to carrier particles.

These and other objects and advantages of the invention will become obvious from the following detailed description.

THE INVENTION

The single unit fluidized-bed reactor of the invention for purification of waste water with biomass attached to carrier particles comprises a liquid distribution device above the bottom of the reaction space particularlly suited for introduction of waste water in wide reactors to achieve uniform fluidization therein, said device consisting of a number of substantially horizontal pipes, each having in the under-surface a number of regularly distributed openings for downward introduction of the liquid, and on top of the reaction space united therewith a multifunctional separation compartment for complete separation of the gas-liquid-solids mixture leaving the reaction space and for complete return of attached biomass into the reaction space, the separation compartment being construction-wise adaptable to treatments involving large or small gas fractions in reactors of varying width.

In other words, the said fluidized-bed reactor comprises above the bottom of the reaction space a liquid distribution device for the introduction of waste water, and on top of the reaction space a separation compartment for separation of carrier particles overgrown with biomass from the liquid-gas-solids mixture after its upward passage through the reaction space and for separation and accumulation of remaining gas or of gas formed during biological waste water treatment, said separation compartment comprising a space for collection and accumulation of gas remaining or formed provided with a gas outlet, and a settling zone adapted with an opening for the entrance of the liquid-solids mixture, a channel for the return of settled overgrown particles into the reaction space, a weir for the transport of liquid treated biologically into a space provided with a liquid discharge and a liquid recycling line so that the liquid distribution device 2 consists of a number of substantially horizontal pipes, each of them having in the under-surface a number of regularly distributed openings of equal diameter for downward-directed introduction of waste water, the total area of openings per square meter of the cross section of the reaction space 1 being a function of the operational parameters, while the separation compartment 3 comprises a central channel 4 having a maximal diameter not greater than the diameter ($D_1$) of the reaction space 1, which channel is at the underside accessible for at least the gas fraction of the mixture leaving the reaction space and debouches at the upperside into the gas collection and accumulation space 5 of which the gas outlet 6 is adapted with valve 26 to enable generation of at most 1 atmosphere overpressure in the gas collection and accumulation space, whereby the settling zone 7 is arranged concentrically around the channel 4, the gas collection and accumulation zone is extended over at least a part of the settling zone 7, and the settling zone 7 is connected at the upperside by a weir 8 with a concentrically around the settling zone 7 arranged liquid collection space 9 for the liquid treated biologically and at the underside with the reaction space 1 via a channel 18 for external or internal return of settled carrier particles overgrown with biomass.

The liquid distribution device and the separation compartment form a reaction space 1 of which the height $H_1$ and the diameter ($D_1$) are mutually related by the ratio.

$$H_1/D_1 = 2 \text{ to } 40$$

For application on industrial scale using reactors of large diameter, a more suitable interrelation is given by the ratio $$H_1/D_1 = 2 \text{ to } 10$$

It will be appreciated, that the construction and the operation of the head of the reactor, i.e. the separation compartment and its assets, are such, that application of the head of the reactor is possible in a way nearly independent of the size of the reaction space, particularly with respect to the diameter of the cross section of the reaction space, so that the examples illustrating the invention also involve application of modifications of the head of the reactor in narrow reactors of lab scale or pilot plant scale. However, the novel liquid distribution device of the invention pertains more specifically to wide industrial reactors since for narrow reactors, wherein uniform fluidization is reached relatively easier, the construction of the liquid distribution device does not matter so much so that for such reactors the novel construction of the head of the reactor of this invention can be combined with a number of already known systems for the introduction of liquid.

As already indicated, the overall construction of this reactor was influenced by a number of characteristics of the processes of the two U.S. patents mentioned above which characteristics are generally not to be found in processes of other methods employing the fluidized-bed principle for the purification of waste waters. These characteristics and their consequences for the construction of this reactor can be summarized as follows:

The process of U.S. Pat Nos. 4,490,258 and 4,560,479 specifically do not involve the use of an additional stirring device and this feature simplifies the construction of the head of the reactor. On the other hand, absence of an additional stirring device places more weight on the necessity for creating uniform fluidization over the entire section by only the flows of gas and in particular of liquid. The absence of an additional stirrer also makes it more difficult to prevent excessive appearence of a well-known phenomenom in biological fluidized-bed processes in that the attached bio-layers tend to be more thick in the top than in the bottom of the fluidized-bed;

The firmly attached bio-layers of these processes can be prepared and maintained by creating and maintaining sufficient but non-destructive turbulence in all parts of the fluidized-bed. This turbulence matched with appropriate control of the residence time of the incoming waste water in the reaction space prevents generation of unstable attached bio-layers by insertion of not well-adhering species and sub-species of the microorganisms involved which species in these processes are washed out continuously and therefore do not get the time to multiply as they remain to be suspended in the liquid while the liquid residence time is kept lower than the maximal reciprocal growth rate of the microorganisms involved.

In view of these characteristics of these processes, thorough mixing of the contents of the reaction space, particularly in the vicinity of the liquid distribution device, is required especially in cases wherein the gas fraction of the bed is low such as in some anaerobic processes, e.g. denitrification and lower fatty acid production. The processes involved therefore are usually obtained by a sufficiently uniform, but also sufficiently turbulent introduction of liquid over the entire cross section. Whether or not introduced uniformly, laminar influent stream as provided for by the complicated apparatus of U.S. Pat. No. 4,202,774 have no function in an appropriate execution of the processes of U.S. Pat. Nos. 4,490,258 and 4,560,479. It will be appreciated therefore, that in particular the construction of a suitable and yet simple liquid distribution device for the reactor of the invention was the result of considerable trial and error in the experimental sense as well as in the accompanying calculations.

As depicted in the drawings, the reactor can have a number of embodiments whereby the construction of the head of the reactor is primarily related to the nature of the biological conversions to be executed therein, particularly with respect to the relative size of the gas fraction, while the surprisingly simple construction of the liquid distribution device is essentially the same for every waste water purification operation since an appropriate selection of the number and diameter of pipes and openings is primarily influenced by the diameter of the reaction space and by the carrier material to be employed.

FIG. 1 is one embodiment of the reactor which can be applied universally, but is particularly suited for aerobic purifications of waste water and more particularly when air is used as the oxygen source.

FIG. 2 schematically represents a second embodiment which is particularly suited for waste water treatments involving a relatively low level of gas production such as in denitrification and production of a mixture of lower fatty acids from not previously treated waste water as well as in general for the production of methane by e.g. anaerobic fermentation of soluble waste or a mixture of lower fatty acids produced in a previous acetogenic step, enabling expedient further treatment of collected and accumulated methane to a methane-containing gas mixture suited as source for energy. This embodiment form of the reactor is also suited for aerobic treatment of waste waters using pure oxygen which can be introduced by previous dissolution in the waste water or by an additional gas inlet device adjusted in the usual manner below the liquid distribution device in the bottom of the reaction space.

Figure 1:
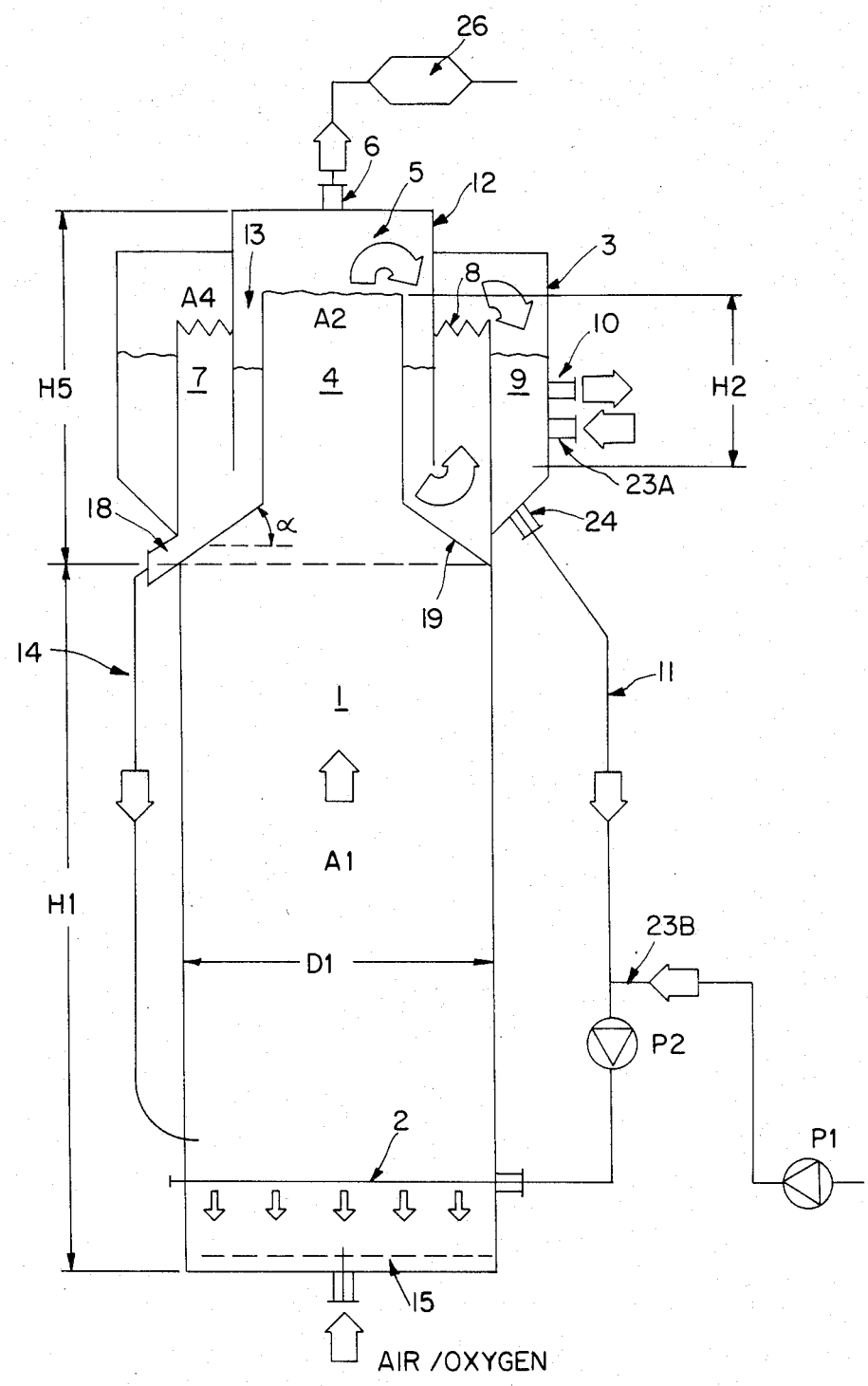
Figure 5:
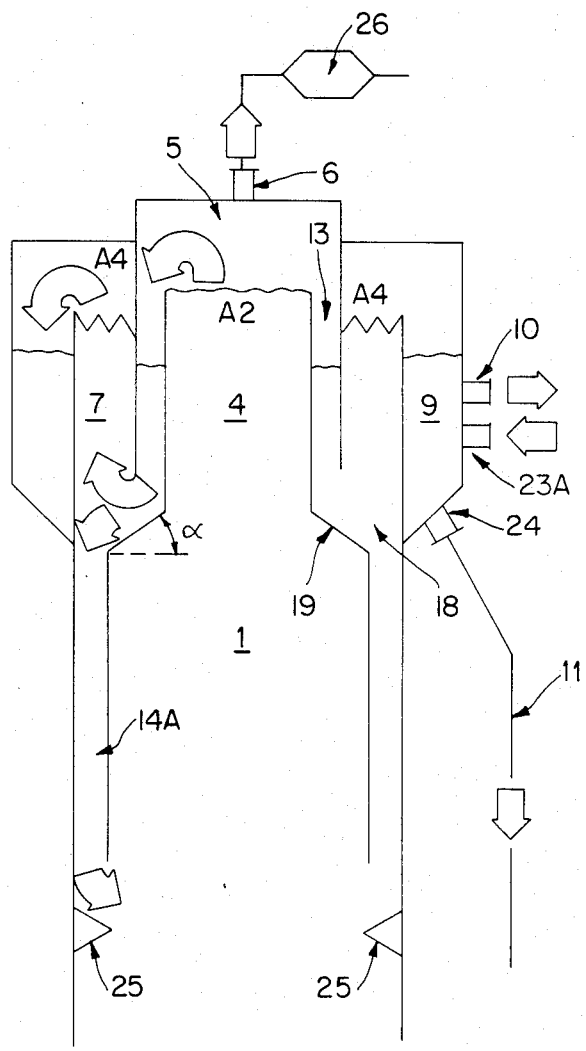

FIG. 5 schematically is a modification of the installation of FIG. 1 wherein the settled carrier particles overgrown with biomass are returned along the inner wall of the reaction space into the lower part of the reaction space.

Figure 2:
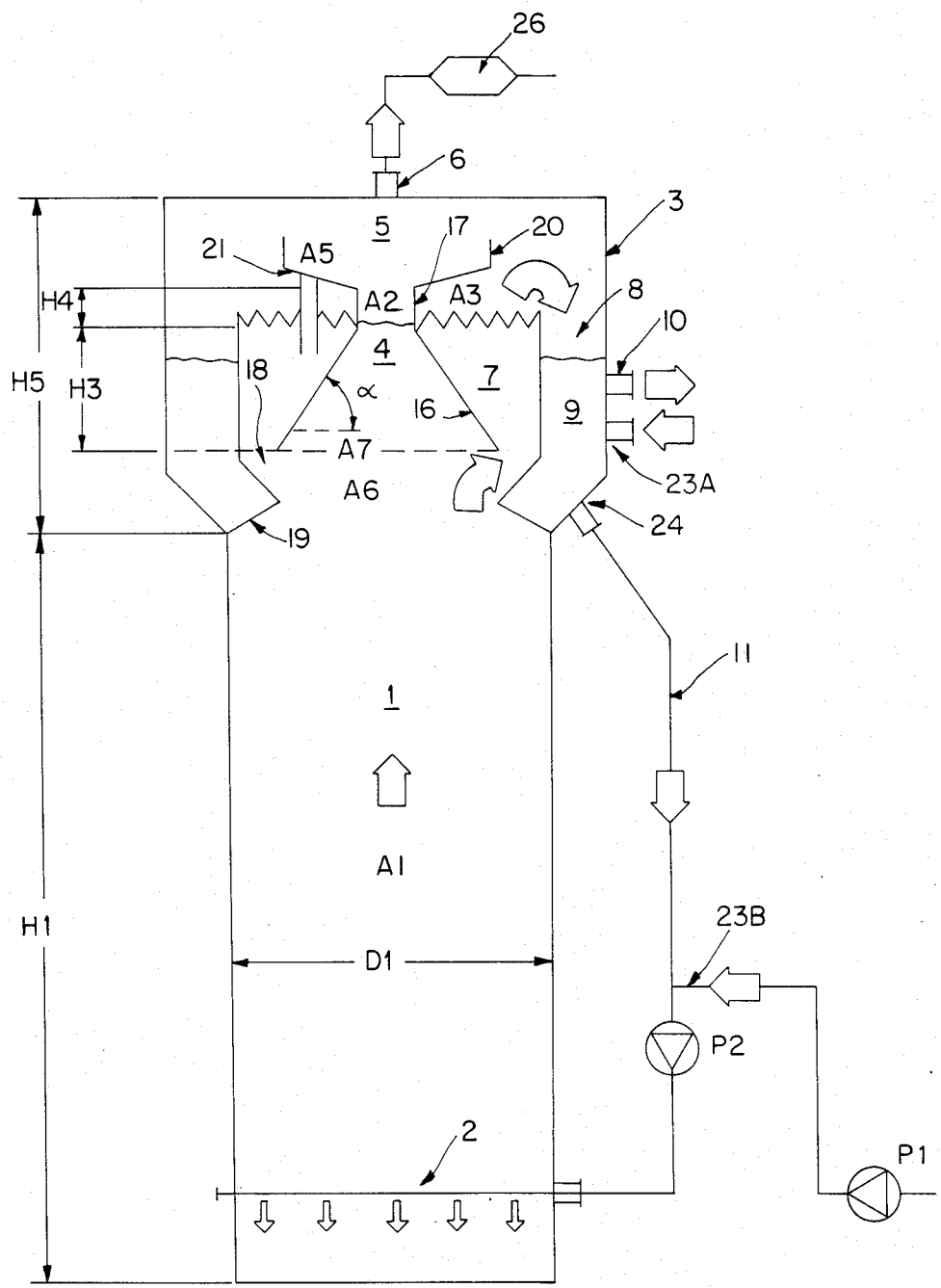
Figure 6:
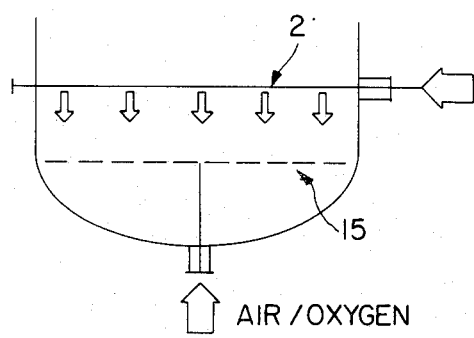
Figure 7:
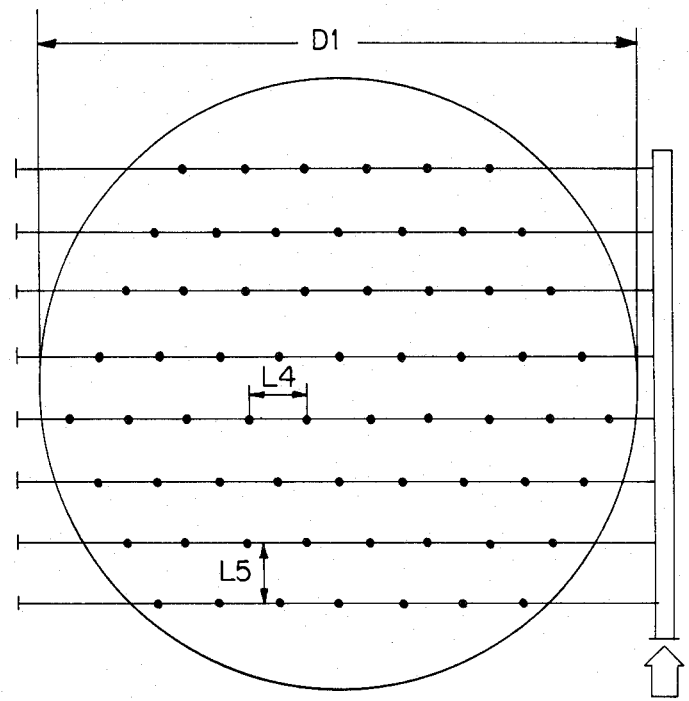
Figure 8:
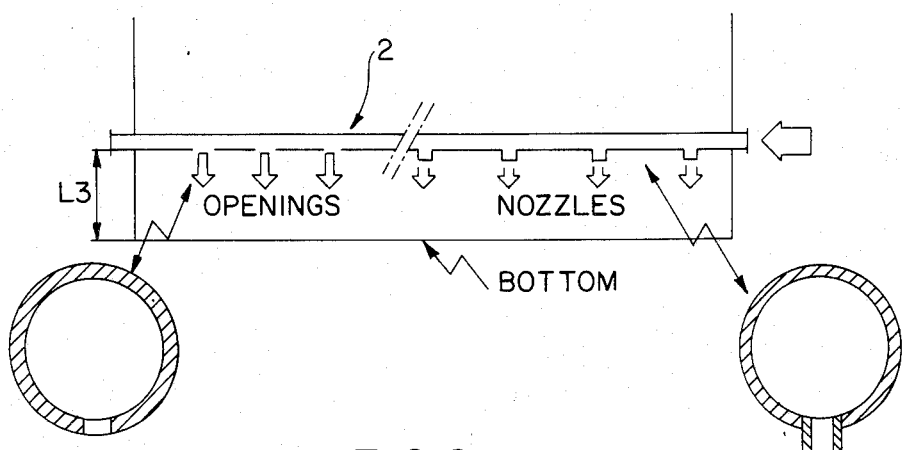

FIG. 7 is a top view and FIGS. 6 and 8 are a side view of the liquid distribution device for the reactors of FIG. 1 and FIG. 2.

The construction and the working of the reactors and their parts as well as the conditions preferably met by the apparatus now will be described and explained in more detail in the light of the treatment of waste water to be purified.

The manner in which the waste water is introduced in the reactors of FIGS. 1 and 2 depends on whether or not it is deemed necessary with respect to the efficacy of purification reached, and or expedient with respect to the desired expanison of the fluidized-bed, to dilute untreated waste water with recycled water, and whether the reactor is the first or a subsequent reactor of a series of reactors arranged for complete purificaton of the waste water. Generally however, there will be at least some dilution with recycled water and in that case and in a normal execution of purification with reactors of the invention under practical circumstances, it makes a difference whether a reactor of FIGS. 1 or 2 is the first or a subsequent reactor in the series of reactors. If the reactor is the first one, it is possible but generally not necessary to effect the admixture of untreated waste water with recycled water already in the liquid collection space 9 with the help of the device explained by FIG. 4. For any subsequent reactor, it is preferred however to carry out the admixture already in the collection space 9 since in this way it is possible to eliminate one pump for every subsequent reactor because opening 10 of a first reactor can be connected to conduct-pipe 23A of the subsequent reactor.

Pump $P_2$ determines the superficial liquid velocity in the reaction space and as soon as the reactor has reached steady state performace, the adjustment of the total flow by pump $P_2$ will remain substantially constant. This means that within reasonable limits, the relative share of recycled water of the total flow introduced by the liquid distribution device is changed automatically as the available amount of untreated waste water introduced via pump $P_1$ varies or as for a subsequent reactor the output via the discharge 10 of the preceeding reactor changes.

Assuming proper functioning of the reactor in the series with respect to the intended level of purification reached, the reasonable limits inferred to here above are determined by the desired range of expansion of the fluidized-bed. Given the mutual relationship of 2 to 40 between the height $H_1$ and the diameter $D_1$ of the reaction space, this expansion preferably will stay between the limits 0 and 5.0. The range for the liquid velocity belonging to this range of expansion is 3 to 90 meters per hour or 0.08 to 2.5 cm per second pertaining to the empty cross section area $A_1$ of the reaction space.

The liquid is introduced and distributed in an uniform way over the entire cross section of the reaction space by the liquid distribution device 2 consisting of a set of substantially horizontal pipes with regularly placed openings in the under-surface of these pipes. Since these openings for downward directed introduction of the liquid are prone to wear or erosion during extended use, it is preferred to provide them with erosion-resistant nozzles which can be replaced when worn out.

It will be appreciated that the bottom of the reaction space can be flat, but that a round or oval bottom is construction-wise more economical and stronger and a round bottom therefore involves an inward increase of the distance between the bottom of the reaction space and the openings of the liquid distribution device. In particular, at small distance from the walls of the reaction space, the turbulent streams of liquid coming out of the openings collide with the bottom and the resulting highly turbulent liquid motions will then lead to erosion of the bottom unless the distance between openings and bottom is sufficiently large.

In general, therefore this distance will vary between 10 cm minimally and 300 cm and for wide reactors of large scale industrial operation, a suitable range of this distance is 20 to 200 cm. In normal practice, the danger of erosion of the bottom is further reduced considerably by an automatically appearing forces-absorbing layer of practically bare carrier particles covering the bottom.

It is clear that the total surface of the openings in the under-surface of the liquid distribution device is an important criterion for the proper functioning of the liquid distribution device. In the general sense, this total surface of the openings depends on the operational parameters of the reactor and the suitable selection of the parameters of the liquid distribution device, i.e. the number of openings, the number of horizontal pipes, etc., resulting in the total surface of the openings, is determined in a first approach by the superficial liquid velocity which has to be attuned adequately to the specific waste water purification in question in relation to the type of waste water purification envisaged and to the space loads reachable therein. The concentration of the contaminants thereby also is an important aspect to be considered. The general foundation is that the total area of the openings has to be selected so that the drop of pressure in the openings is sufficiently large to reach uniform flow of liquid through all the openings. To achieve a certain conversion, a sufficient quantity of biomass has to be reached in the reactor and the quantity of biomass to be reached in firmly attached bio-layers of non diffusion-limiting thickness is directly proportional to the surface area of the particles. The total surface of the particles then has its influence on the selection of the type of carrier material, but that choice should be in harmony with the superficial liquid velocity as well. For these reasons the construction of the liquid distribution is such that the total surface of the openings in the undersurface of the liquid distribution device is adjusted to the superficial liquid velocity in the reaction space, to the total mass of carrier particles, and to size and specific weight of the carrier particles.

Such considerations in combination with experience gathered in practice have led to the result that it is expedient to employ a total area of openings in the undersurface of the liquid distribution device of 15 to 200 square centimeters per square meter of the cross sectional area of the reaction space. For a considerable part of suitable and practical embodiments, this area will fall in the range of 25 to 150 square centimeters per square meter of the cross sectional area of the reaction space. Although for uniform introduction of the liquid, it is sufficient that the substantially horizontal pipes are placed regularly and the openings are also distributed in a regular fashion, it is preferred to use equidistant horizontal pipes and suitably the openings in these pipes are also equidistant in the pipe direction.

The manner in which the horizontal pipes of the liquid distribution device are fed with waste water can be different. For instance, this can be done by one main pipe through the wall which pipe then debouches in a bent pipe along the wall, this bent pipe having a length smaller than $0.5\pi D_1$. The horizontal pipes then sprout from this bent pipe. However, crude waste water often contains suspended solid material which may cause stoppage of the liquid distribution device. Therefore, it is expedient to use a construction which enables simple cleaning of the liquid distribution device. As depicted in FIG. 7, a preferred construction involves transfixion of the wall of the reaction space by all horizontal pipes, not only at the liquid entrance section of the wall but also at the opposite wall section where the extremities of the horizontal pipes are closed on the outside during use of the reactor. It will be appreciated with respect to the desired uniform introduction of the liquid, that the drop of pressure over the feed-pipe for the horizontal pipes is negligible in view of the very much larger drop of pressure in the openings of the liquid distribution device.

It will be realized that for uniform introduction of the liquid the interrelation between the number of horizontal pipes, the interspace $L_5$ between them and their diameter is a function of the size of the reaction space so that the number of the substantially horizontal pipes falls within the range of 1.5 to 4 pipes per meter of the diameter $D_1$ of the reaction space, while the interspace $L_5$ between them may vary between 25 and 100 cm and the diameter of them is selected from a range of 2 to 15 cm. With respect to the diameter of the substantially horizontal pipes, it is inferred that this diameter preferably is equal for all pipes in case of an angular shape and in particular rectangular shape of the reaction space, but that for a cylindrical reaction space, it is possible and in view of savings of material actually preferred to use a set of pipes wherein the diameter increases gradually going from pipes near the wall to pipes in the center of the reaction space. Suitably the diameter of the innermost pipes is 1.5 to 1.65 times greater than the diameter of the outermost pipes.

In view of the desired uniform introduction of the liquid, the prevailing interrelation between the total number of openings, the interspace between them and their diameter can be expressed in that the total number of openings in the undersurface of the liquid distribution device is 2.5 to 15 per square meter of the area of the cross section of the reaction space, the mutual distance $L_4$ between them in the pipe direction is 25 to 75 cm, and their diameter is 0.5 to 3 cm. It is to be added, that as long as the mutual distance $L_4$ between the openings in the pipe direction falls between 25 and 75 cm, it is sufficient that the distribution of the openings over the pipes is regular, although it is normally preferred to employ equidistant openings. Necessary however is, that all openings within one and the same distribution device have the same diameter.

After its uniform distribution over the entire cross section of the reaction space by the liquid distribution device 2 of the invention, the liquid flows upward through the reaction space whereby the carrier particles overgrown with biomass present in the reaction space (not indicated in the figures) are brought to fluidization and are kept in that state. The carrier particles involved can have the usual size and specific weight, i.e. 0.1 to 3 mm and 2 to 5 g/cm$^3$.

In the reactor of FIG. 1, the mixture of purified waste water, carrier particles overgrown with biomass and gas thereafter enters the separation compartment 3 wherein the mixture flows upward through the central channel 4 into the gas collection and accumulation space 5 which is confined with a dome-shaped hood 12 placed over channel 4. The sidewall of hood 12 reaches down to within the settling zone 7 to a level lower than the level of the weir 8 but higher than the oblique bottom of the settling zone 7. The gas separates in the gas collection and accumulation space 5 and the gas is discharged through the gas outlet 6 which is adapted with a valve 26 to enable generation of at most 1 atmosphere overpressure in the gas collection and accumulation space. An overpressure of about 0.2 to 0.5 atmosphere in the gas collection space 5 is advantageous for the necessary subsequent elimination of e.g. odoriferous components from the exhaust gas of aerobic treatment of waste water by washing, while an overpressure of around 0.5 atmosphere is expedient for the subsequent purification (e.g. in particular removal of hydrogen sulfide to give solutions of this gas in water suited for reuse in the denitrification of nitrate-rich waste water) of methane gas generated during anerobic removal of COD as carried out preferably in a reactor according to FIG. 2.

The purified waste water together with the carrier particles overgrown with biomass flow over the rim of the channel 4 and thereafter enter the settling zone 7 via passage through the annular cleft 13. The carrier particles overgrown with biomass settle on the oblique bottom of the settling zone while the purified water flows over the weir 8 which is preferably applied as a serrated brim to realize equable transport of the water into the liquid collection space 9 from which this purified water is in part recycled into the reaction space via conduit-pipe 11 and pump $P_2$, while the remaining part is discharged via conduit-pipe 10, the opening of which is placed below the water-level in the space 9.

The settling carrier particles overgrown with biomass accumulate on the downward-directed oblique bottom of the settling zone 7 and they are returned into the reaction space by return pipes 14 starting from one or more points, preferably 1 to 12 points, in the lowest level 18 of the settling zone. The introduction of returned particles into the reaction space can take place at different heights above the liquid distribution device, but preferably somewhat below halfway the distance between the roof of the reaction space and the liquid distribution device enabling rapid distribution of the particles in the fluidized-bed without danger of stoppage in the return pipes 14. As depicted in FIG. 1, the return of the overgrown particles can take place through one or more conduit-pipes 14 placed outside the reaction space along the outer wall and debouching in holes in the outer-wall.

Alternatively, as depicted in FIG. 5, the return of attached biomass can also be effected inside the reaction space by an internal peripheral cleft 14A, starting from the channel 18 and terminating just above peripheral triangular ledge 25 of small horizontal diameter as compared with the diameter $D_1$ of the reaction space, which ledge 25 is also suitably placed below half the distance between the roof of the reaction space and the liquid distribution device.

For reasons and conditions explained before, the untreated waste water is usually mixed with a part of the purified water in a degree regulated by the flow controling pump $P_2$. This admixture takes place either outside the liquid collection space 9 in a conjuction up stream of pump $P_2$ of conduit-pipe 11 containing purified water derived from the collection space 9 with pipe 23B containing untreated waste water, or inside the collection space 9. The manner wherein this latter admixture is carried out preferably is depicted schematically in FIG. 4 and can be explained as follows. Space 9 is divided by a baffle 22, at one side of and close by the baffle is adjusted a below surface opening for the discharge 10 of purified water into the sewer or into a next reactor. At the other side of the baffle again placed close by the baffle are an opening for the introduction of untreated waste water by conduit-pipe 23A and an opening 24 through which the admixed liquid leaves the liquid collection space in the direction of pump $P_2$ through conduit-pipe 11. Suitably, this method of admixing is always used in subsequent reactors in a series since the flow of through 10 discharged water of a first reactor into the inlet 23A of a subsequent reactor saves a pump $P_1$.

The installation of FIG. 1 is particularly suited for the execution of biological processes wherein large amounts of gas are consumed. With respect to waste water purifications this is the case in aerobic removal of COD and in nitrification if as preferred the oxygen needed is supplied in the form of air. The supply of gas preferably takes place in an opening in the bottom of the reaction space by a gas inlet and distribution device 15. To reach optimally effective operation, the central channel 4 of the installation of FIG. 1 suitably is cylindrical while the diameter of the channel preferably is 0.5 to 0.8 times the diameter $D_1$ of the reaction space corresponding with a preferred cross sectional area ratio $A_2/A_1 = 0.25$ to 0.65. Under such conditions, a sufficiently uniform upward flow is ensured.

Since it is more suitable to use a diameter of channel which is smaller than diameter $D_1$ of the reaction space, the roof 19 forming the transition between the reaction space and the channel 4 preferably has the shape of a truncated cone as has been depicted in FIG. 1. The diameter of the dome-shaped hood 12 preferably is such that the superficial velocity, calculated on the basis of the empty cross sectional area of annular cleft 13, of the liquid flowing down over the rim of channel 4 is never greater than 5 cm/s. The height $H_2$ of the sidewall of annular cleft 13 preferably is 0.05 to 0.3 times the height $H_1$ of the reaction space.

The in upward direction flowed-through cross sectional area $A_4$ of the settling zone 7 being situated between the outer wall of the annular cleft 13 and the inner wall of the liquid collection space 9 preferentially is 0.5 to 3 times as large as the cross sectional area $A_1$ of the reaction space. Such a ratio results in a sufficient difference between the velocities of the upward flow of liquid and the settling of the carrier particles overgrown with biomass so that good settling is ensured.

The adequate heights of a number of elements of the separation compartment 3 as they are related to the dimensions of the reaction space (in particular the height thereof), such as the height of the oblique bottom of the settling zone varying with the choice of the angle of inclination ($\alpha$), the effective height of the gas collection and accumulation space 5 above the rim of channel 4, and the expedient height of the side wall of the dome-shaped hood 12 beneath the rim of channel 4 lead to a possible variation in the total height $H_5$ of the separation compartment 3 of 0.1 to 0.6 times the height $H_1$ of the reaction space 1.

To effect transport of the settled overgrown particles to the lowest section of the settling zone 7 from which the attached biomass gravitates into the reaction space by way of return pipes 14 adjusted to openings in the bottom of the settling zone or by way of internal peripheral cleft 14A, the slope of the oblique bottom has to be at least $0.5(\alpha \geq 30°)$.

No special provisions, like pumps, are required for the return of the overgrown particles through conduit-pipes 14 or through the internal peripheral cleft 14A into the reaction space. This advantageous feature is the result of the presence of the "airlift" phenomenon in the reactor wherethrough the overgrown particles flow downward through conduit-pipes 14 or peripheral cleft 14A by themselves. The air lift is created by the difference in specific weight of on the one side the mixture of the carrier particles overgrown with biomass and purified water and on the other side of the fluidized mixture of gas, liquid and attached biomass leaving the reaction space.

Occasionally, it is expedient to be able to regulate the air lift recycling of the settled attached biomass in the conduit-pipes 14 and in principle this can be performed by means of valves in the conduit-pipes 14. This solution however is not only expensive in case of more than a few conduit-pipes 14, but is also not sufficiently adequate in view of possible occurrence of unequal flow of attached biomass in the conduit-pipes, of stoppages in the pipes, and of damages in the bio-layer structures with as a result not attached biological material. Since the effect of the air lift amounts to a difference in pressure, an excessively fast flowing air lift can be slowed down by increasing the pressure in the gas collection and accumulation space 5 since thereby the pressure difference is diminished. For this reason too, the outlet 6 of the gas collection space has the pressure regulation device 26 and the overpressure needed for efficient control of the air lift amounts to maximally 30% of the static pressure prevailing in the bottom of the reaction space.

The purified water flowing over the weir 8 is received in the liquid collection space 9 which provides for a buffer capacity making it possible to meet irregularities in the discharge and the supply of the water whereby in addition the discharge through conduit-pipe 10 of water leaving the reactor can be kept in hand with the help of a liquid level-metering device adjusted in the liquid collection space 9. Preferably, the volume of the liquid collection space is 1 to 25% of the volume of the reaction space.

The apparatus of FIG. 2 in which the various parts have the same number as the corresponding parts of the reactor of FIG. 1 differs from the apparatus of FIG. 1 in a different form of the separation compartment 3 to make the installation suitable particularly for methane-producing anaerobic purification of waste water and in general for biological processes wherein comparatively small amounts of gas are formed or introduced.

In the apparatus of FIG. 2, the channel 4 of the separation compartment consists of a truncated cone-shaped part 16 faced with its base towards the reaction space and a relatively shorter cylindrical element 17 connected with the top of the truncated cone. The truncated cone-shaped part 16 of the channel 4 is separated at its base from the roof 19 of the reaction space by a channel of annular construction 18 which brings about communication between the reaction space and the settling zone 7 for upward passage of the mixture of liquid and carrier particles overgrown with biomass and the downward passage of settled carrier particles overgrown with biomass. Normally, as depicted in FIG. 2, the gas collection and accumulation space 5 is stretched out over the entire cross section of the separation compartment.

The working of this separation compartment is as follows: The mixture of purified water, carrier particles overgrown with biomass and gas bubbles enters the truncated cone-shaped part of the channel 4 wherein the bubbles assemble to give a rising stream of gas. The diameter of the cylindrical element 17 is chosen so that the superficial gas velocity therein cannot increase over 10 cm/s. The gas accumulates in the gas collection and accumulation space 5 at an overpressure of normally about 0.5 atmosphere when the gas developed contains methane and impurities to be removed from it like hydrogen sulfide. Liquid foam eventually carried along with the gas flow is separated in a foam-receiving dish 20 adjusted on top of the cylindrical channel 17. The breaking of the liquid foam produces liquid which flows back either via channel 4 or via channel 21 connecting the dish 20 with the settling zone 7.

Liquid and carrier particles overgrown with biomass directly enter the settling zone 7 by way of the annular opening 18 due to the flow resistance encountered by this suspension in upward passage through channel 4. This flow resistance in channel 4 is greater than the flow resistance in the passage through the annular opening 18 if the difference in level $H_4$ between the upper rim of the cylindrical element 17 and the serrated brim of weir 8 is sufficiently large. The suspended carrier particles overgrown with biomass settle in the settling zone 7, glide downward along the oblique slope of the truncated cone-shaped part 16 functioning as the bottom of the settling zone, and return to the reaction space by passing the annular opening 18. Again as in the apparatus of FIG. 1, the angle of inclination ($\alpha$) of the bottom of the settling zone preferably is at least 30°. The purified water flows over the weir 8 into the liquid collection space 9 from which it is in part discharged through conduit-pipe 10 and in part recycled into the reaction space.

Figure 4:
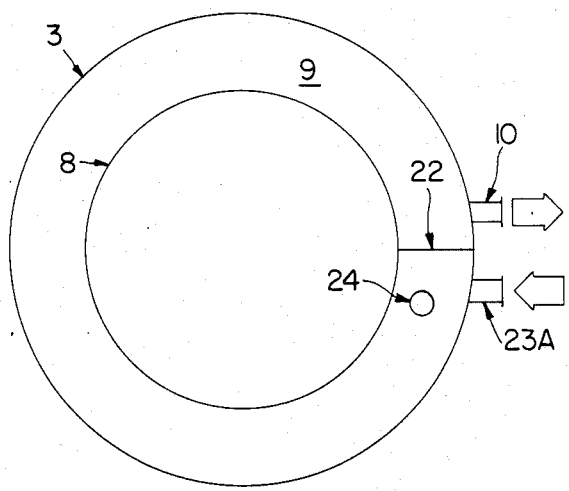
FIG. 4 is an horizontal cross-section of the separation compartment of a fluidized-bed reactor of the invention particularly illustrating schematically the partitioning of treated waste water into a part to be discharged and a part intended for recycling by admixture with untreated waste water.

Here again, the admixture of purified water to be recycled with untreated water can take place either in the liquid collection space 9 itself with the help of the adaptation indicated in FIG. 4 or up stream of pump $P_2$ in the liquid return pipe 11 whereby the supply of untreated water occurs respectively by pipe 23A and pipe 23B. As indicated before, the admixture within the liquid collection space is preferentially only applied if the apparatus of FIG. 2 is not the first of the series of reactors.

The separation compartment 3 of the installation of FIG. 2 is optimally effective if the difference in height $H_4$ between the top of the cylindrical element 17 and the brim of weir 8 of the settling zone is 0.05 to 0.2 times the height $H_3$ of the settling zone 7, and the height $H_3$ of the settling zone 7 is 0.3 to 1.5 times the diameter $D_1$ of the reaction space 1 in view of the desired angle ($\alpha$) of the truncated cone 16. Furthermore, adequate settling of carrier particles overgrown with biomass requires a cross sectional area $A_3$ of the settling zone 7 of at least 0.4 times the cross sectional area $A_1$ of the reaction space 1. Suitably the area $A_3$ is 0.4 to 3 times the area $A_1$. With respect to equable return of the carrier particles overgrown with biomass into the reaction space, it is also expedient to confine the diameter of the cross sectional area $A_6$ of the upperside of the roof 19 of the reaction space to a magnitude of 0.5 to 0.9 times the diameter of the cross sectional area $A_1$ of the reaction space. In view of the in practice expedient heights of a number of parts of the separation compartment, the total height of the separation compartment is 0.4 to 2 times the diameter $D_1$ of the reaction space 1.

To prevent gas bubbles being carried along with the suspension of purified water and carrier particles overgrown with biomass into the settling zone 7 instead of flowing upward through the channel 4, the diameter of the area $A_7$ of the base of the truncated cone-shaped part 16 of channel 4 has to be greater than the diameter of the area $A_6$ of the roof 19 of the reaction space 1. The magnitude of this difference in diameters is determined by the superficial liquid velocity prevailing in the channel of annular construction 18. This matter can be approached with the help of a formula and a drawing according to FIG. 3 wherein $L_1$ is the vertical distance between the base of cone 16 and the rim of roof 19 and $L_2$ is 0.5 times the difference between the diameters of the cross sections $A_7$ and $A_6$ involved.

If the superficial liquid velocity in the annular opening 18 is indicated by $v_L$ and the rising velocity of the gas bubbles by $v_B$, then gas bubbles are not carried along with the liquid, if $$L_2 >> v_L/v_B \cdot L_1$$

The practical result suitably is that the difference $L_2$ between the radii of the cross sectional area's $A_7$ and $A_6$ is at least 0.05 times the distance $L_1$ between the base of the cone-shaped part 16 and the upperside of the roof 19. Preferably, the difference $L_2$ between the radii of $A_7$ and $A_6$ is 0.15 to 0.8 times the vertical distance $L_1$ between the base of the cone and the roof.

In the following examples there are described several preferred embodiments to illustrate the invention. However, it should be understood that the invention is not intended to be limited to the specific embodiments.

EXAMPLE 1

Aerobic treatment of waste water containing 800 mg per liter of COD.

The purification was performed in a pilot scale fluidized-bed reactor provided with a separation compartment of FIG. 1. The various dimensions and details were as follows: $H_1=6$ m, $D_1=0.25$ m, 300 liter of useful reactor volume. $A_1=0.05$ m$^2$, A2=cross sectional area of annular cleft $13=0.033$ m$^2$, cross sectional area $A_4$ of the upper part of the settling zone=0.13 m$^2$.

Height $H_2$ in the dome-shaped hood $12=1$ m.

The total height $H_5$ of the separation compartment was 1.75 m.

Volume of the liquid collection space $9=4$ liter.

The angle of inclination was 45°.

Six external conduit-pipes for the return of carrier particles overgrown with biomass debouching at 0.55 m above the bottom of the reaction space.

The liquid was introduced by a circular tube, the under-surface of which was a distance of 1.5 cm from the bottom. The heart to heart diameter of this tube was 15 cm while the diameter of the tube was 2 cm. The tube had 8 equidistant openings in the under-surface with a diameter of 0.8 cm and the total area of the openings was 80 cm$^2$ per square meter of cross section. The carrier material was sand with a particle size of 0.1 to 0.3 mm and the amount of sand was 250 g per liter of useful reactor volume.

The influent flow of waste water passing pump $P_1$ and conduit-pipe 23B was 960 liter per hour. Since there was no recycling through conduit-pipe 11, the total influent flow passing pump $P_2$ was also 960 liter per hour. The liquid velocity in the openings of the liquid distribution device therefore was 0.66 m/s. Air was introduced in the bottom with a flow of 20 $Nm^3$ per hour. The temperature in the reaction space was 40° C. and the pH was 7.0.

The result was a stable performance of the reactor and the separation of the carrier particles overgrown with biomass in the separation compartment 3 was complete as was the return of the overgrown particles into the reaction space. The stability of the operation condition was also apparent from the absence of excessive accretion in biomass. The COD concentration in the effluent was 240 mg per liter and the COD removal efficiency therefore was 70%. The quantity of biomass was 15 g of organic dry matter per liter of reactor volume and the COD load introduced was 61 kg per $m^3$ of reactor volume per day. The COD conversion therefore amounted to 43 kg per $m^3$ of reactor volume per day.

EXAMPLE 2

Anaerobic treatment of waste water containing 2500 mg per liter of COD in the form of lower fatty acids was purified to yield methane and carbon dioxide in a pilot scale fluidized-bed reactor adapted with a separation compartment 3 according to FIG. 2. The various dimensions and details were as follows:

$H_1 = 6$ m, $D_1 = 0.25$ m, 300 liter of useful reactor volume.

$A_1 = 0.05$ $m^2$, the cross sectional area $A_2$ of the cylindrical element $17 = 0.013$ $m^2$, the cross sectional area $A_6$ in the top of the roof 19 of the reaction space $= 0.035$ $m^2$, the cross sectional area $A_7$ at the base of channel $4 = 0.053$ $m^2$, the cross sectional area of the channel of annular construction $18 = 0.033$ $m^2$.

Height $H_3$ of the truncated cone $16 = 0.20$ m, the height $H_4$ of the cyclindrical element $17 = 0.04$ m.

The total height $H_5$ of the separation compartment was 0.43 m. Angle of inclination of the oblique bottom of the settling zone $7 = 76°$.

Volume of the liquid collection space $9 = 5$ liter.

Figure 3:
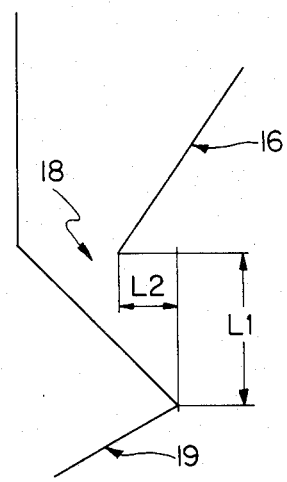
FIG. 3 is an enlarged detail of the separation compartment of the reactor of FIG. 2.

$L_1 = 0.083$ m (FIG. 3)
$L_2 = 0.025$ m (FIG. 3)

The rising velocity of the gas bubbles ($v_B$) is about 20 cm/s.

The liquid distribution device was the same as described in Example 1. The carrier material was sand with a particle size of 0.1 to 0.3 mm and the amount of sand was 400 g per liter of useful reactor volume. The influent flow of untreated waste water passing pump $P_1$ and conduit-pipe 23B was 300 liters per hour. Since the recycled flow through conduit-pipe 11 was 100 liters per hour, the total influent flow passing pump $P_2$ was 400 liters per hour. The liquid velocity in the opening adjusted with nozzles was 0.27 m/s and the temperature in the reaction space was 37° C. and the pH 7.0.

The performance of the reactor was stable for a few months as a consequence of complete separation of carrier particles overgrown with biomass in the separation compartment 3 and complete return of the overgrown particles in the reaction zone. There was no further accretion of biomass after reaching steady state conditions. The amount of gas formed was 10 $Nm^3$ per day, of which the methane content was 65%. The fatty acid concentration in the effluent was much less than 200 mg per liter and the quantity of biomass was 40 g of organic dry matter per liter of fluidized-bed. The COD load introduced was 60 kg per $m^3$ of reactor volume per day and the COD load converted amounted to 55 kg per $m^3$ of reactor volume per day. The COD removal efficiency therefore was greater than 90%.

EXAMPLE 3

Anaerobic treatment of waste water containing 2500 mg per liter of COD in the form of lower fatty acids was purified to yield methane and carbon dioxide in a full scale cylindrical fluidized-bed reactor adapted with a separation compartment 3 according to FIG. 2 and a liquid distribution device according to FIGS. 7 and 8. The dimensions of the reaction space were as follows: $H_1 = 15.0$ m, $D_1 = 4.75$ m, $A_1 = 17.7$ $m^2$, useful volume of the reactor $= 250$ $m^3$, cross sectional area $A_6$ of the upperside of roof 19 $= 7.1$ $m^2$ (diameter $= 3.0$ m).

The various dimensions and details of the separation compartment 3 were the following:

cross sectional area $A_2$ of the cylindrical element $17 = 1.1$ $m^2$ (diameter $= 1.42$ m), cross sectional area $A_7$ at the base of the truncated cone $16 = 9.6$ $m^2$ (diameter $= 3.50$ m), cross sectional area of the channel of annular construction $18 = 8.1$ $m^2$ (diameter $= 3.20$ m), Height $H_3$ of the truncated cone $= 2.2$ m, Height $H_4$ of the cylindrical element $17 = 0.35$ m, Angle of inclination of the oblique bottom of the settling zone $7 = 60°$, volume of the liquid collection space $9 = 50$ $m^3$, total height $H_5$ of the separation compartment $= 5.5$ m.

$L_1 = 1.25$ m (FIG. 3)
$L_2 = 0.25$ m (FIG. 3)

In view of the carrier material employed in this waste water treatment which was river sand with a particle size of 0.1 to 0.3 mm and a specific weight of 2.65 $g/cm^3$, the various measures and details of the liquid distribution device 2 employed were as follows: nine horizontal pipes whereby the two outer pipes had a diameter of 5.5 cm, the next two pipes had a diameter of 7.3 cm, the following two pipes had a diameter of 8.1 cm, the next two pipes had a diameter of 8.5 cm, and the pipe in the middle had a diameter of 8.7 cm. The interspace between the equidistant pipes was 53 cm. The number of openings was 3.1 per $m^2$ of the cross sectional area or 55 in total, and the regular distribution of the openings was arranged according to a triangular pitch. The interspace in the pipe direction between the openings was 61 cm. The diameter of the openings was 1.75 cm. The total area of the openings therefore was 30 $cm^2$ per $m^2$ of the cross sectional area of the reaction space. The distance between the openings and the rounded bottom of the reaction space varied between 25 cm and 200 cm. The openings were provided with erosion-resistant nozzles.

The details of the purification proceedings were as follows: The amount of sand used was 400 g per liter of useful reactor volume and the introduced flow of untreated waste water passing pump $P_1$ and conduit-pipe 23B was 250 $m^3$ per hour. Since the recycled flow of treated waste water through conduit-pipe 11 was 100 $m^3$ per hour, the total flow introduced via pump $P_2$ in the reaction space was 350 $m^3$ per hour. The liquid velocity in the openings was 7.36 m/s and the temperature in the reaction space was 37° C. and the pH was 7.0. At steady state conditions, the amount of biomass attached was 30 g of organic dry matter per liter of fluidized-bed. Thereafter the performance of the reactor remained stable, and there did not occur further accretion of biomass. The amount of gas formed was about 320 m³ per hour. The fatty acid removal efficiency was greater than 95%.

Various modifications of the apparatus of the invention may be made without departing from the spirit or scope thereof and it is to be understood that the invention is intended to be limited only as defined in the appended claims.

What we claim is:

1. A single unit fluidized-bed reactor for purification of waste water with biomass attached to carrier particles, comprising a reaction space equipped with a liquid distribution device above the bottom of the reaction space particularly suited for introduction of waste water in wide reactors to achieve uniform fluidization therein, said device consisting of a number of substantially horizontal pipes, each having in the under-surface a number of regularly distributed openings for downward introduction of a liquid, and on top of the reaction space united therewith a multifunctional three phase separator for complete separation of a gas-liquid-solids mixture leaving the reaction space, said three phase separator comprises a space for collection and accumulation of gas remaining or formed during biological waste water treatment provided with a gas outlet, and a liquid-solid separation compartment positioned and arranged to act on the liquid-solids mixture and provided with means to remove at least a part of the purified liquid and with means for complete return of the carrier particles overgrown with biomass into the reaction space by gravity, the gas oulet is provided with a means for increasing gas pressure in the gas collection and accumulation space, the three phase separator being construction and arranged so as to act on treatments involving large or small gas fractions in the reactor.

2. The fluidized-bed reactor of claim 1 wherein the total area of the openings in the under-surface of the liquid distribution device is 15 to 200 square centimeter per square meter of the cross section of the reaction space.

3. The fluidized-bed reactor of claim 2 wherein the total height $H_5$ of the three phase separator is 0.1 to 0.6 times the height $H_1$ of the reaction space.

4. The fluidized-bed reactor of claim 1 wherein in the liquid distribution device the substantially horizontal pipes are equidistant and the openings in the under-surface of these longitudinal pipes are equidistant in the longitudinal direction of these pipes.

5. The fluidized-bed reactor of claim 4 wherein in the liquid distribution device, the number of substantially horizontal pipes is 1.5 to 4 per meter of the diameter $D_1$ of the reaction space, the diameter of these pipes is 2 to 15 cm and the mutual distance $L_5$ between them is 25 to 100 cm.

6. The fluidized-bed reactor of claim 4 wherein the total number of openings in the under-surface of the liquid distribution devices is 2.5 to 15 per square meter of the area of the cross section of the reaction space, the mutual distance $L_4$ between them in the longitudinal direction is 25 to 75 cm, and the diameter of the openings is 0.5 to 3 cm.

7. The reactor of claim 1 wherein the three-phase separator is comprised of a central cylinder having an outer wall and a truncated cone between the top of the reaction space and the bottom of the cylinder whereby the gas is recovered above the cylinder in the gas collection and accumulation space which space is separated from the liquid-solid separation compartment, the top of the cylinder adjoins a U-shaped cross-section chamber comprising two legs and a partition between these legs, and the solids and liquid overflow the top of the cylinder into one of said legs of said U-shaped cross-section chamber, the solids being returned by gravity from the bottom of the U-shaped chamber into the reaction space and the liquid is removed over the top of the other of said U-legs provided with a weir and means to remove at least a part of the liquid passing through the weir from the reactor.

8. The fluidized-bed reactor of claim 7 comprising an annular cleft 13 having a side wall and situated in the one leg of the U-shaped chamber and a dome-shaped hood 12 and the diameter of the cylinder 4 is 0.5 to 0.8 times the diameter of the reaction space, the height $H_2$ of the side wall of the annular cleft 13 situated in the one leg of the U-shaped chamber is 0.05 to 0.3 times the height $H_1$ of the reaction space, the cross sectional area $A_4$ of the liquid-solid separation compartment 7 is 0.5 to 3 times the cross sectional area $A_1$ of the reaction space and the diameter of the dome-shaped hood 12 comprising the partition between the legs of the U-shaped chamber is such that the mixture of liquid and biomass attached to carrier particles flows with a velocity not greater than 5 cm per second into the liquid-solid separation compartment 7 via in succession the cylinder 4 and the annular cleft 13 between the dome-shaped hood 12 and the outer wall of the cylinder 4.

9. The fluidized-bed reactor of claim 7 further including a return settled carrier particles channel 18 consisting of at least one conduit-pipe 14 externally placed along an outer wall of the reactor defining said reaction space starting from the bottom of the liquid-solid separation compartment 7 and debouching in holes in the outer wall of the reaction space.

10. The fluidized-bed reactor of claim 7 wherein the bottom of the liquid-solid separation compartment is inclined at an angle ($\alpha$) of at least 30°.

11. The fluidized-bed reactor of claim 7 comprising a collection space 9 for liquid treated biologically wherein the volume of the collection space 9 for liquid treated biologically is 1 to 25% of the volume of the reaction space.

12. The fluidized-bed reactor of claim 29 further including a return settled carrier particles channel 18 consisting of an internal peripheral cleft 14A terminating just above a peripheral triangular ledge 25, the internal peripheral cleft 14A being of small horizontal diameter as compared with the diameter $D_1$ of the reaction space.

13. A single unit fluidized-bed reactor for purification of waste water with biomass attached to carrier particles, comprising a reaction space equipped with a liquid distribution device above the bottom of the reaction space particularly suited for introduction of waste water in wide reactors to achieve uniform fluidization therein, said device consisting of a number substantially horizontal pipes, each having in the under-surface a number of regularly distributed openings for downward introduction of the liquid, and on top of the reaction space united therewith a multifunctional three phase separation compartment for complete separation of the gas-liquid-solids mixture leaving the reaction space and for complete return of attached biomass into the reaction space, said three phase separation compartment being constructed and arranged so as to act on treatments involving variable gas fractions in the reactor, the three-phase separation compartment being comprised of a truncated cone-shaped element with its wide base towards the reaction space and a cylindrical element connected to the top of the truncated cone-shaped element to separate the gas in a gas phase compartment of the three-phase separation compartment, a liquid-solid separation compartment surrounding the exterior of the cone-shaped element and with said liquid-solid separation compartment provided with a weir at its upper end and a channel at its lower end which brings about communication between the reaction space and the liquid-solid separation compartment for upward passage of the mixture of liquid and carrier particles overgrown with biomass and for the return the separated solids by gravity to the reaction space and means to remove at least a part of the purified liquid flowing over the weir from the reactor.

14. The fluidized-bed reactor of claim 13 further including a roof 19 positioned over the reaction space so as to direct gas leaving the reaction space into the cylindrical element, the difference $L_2$ between the radii of the cross section area $A_7$ of the base of the truncated cone-shaped element and the cross sectional area of $A_6$ of the upperside of the roof 19 of the reaction space which roof is separated from the truncated cone-shaped element by a channel 18 which brings about the communication between the reaction space and the liquid-solid separation compartment, is at least 0.05 times the distance $L_1$ between the base of the truncated cone-shaped element and the roof 19, whereby the radius of $A_7$ is greater than the radius of $A_6$.

15. The fluidized-bed reactor of claim 14 wherein the difference $L_2$ between the radii of the area's $A_7$ and $A_6$ is 0.15 to 0.8 times the distance $L_1$ between the base of the truncated cone-shaped element and the upperside of the roof 19.

16. The fluidized-bed reactor of claim 13 wherein the cross sectional area $A_2$ of the cylindrical element 17 is such that the gas velocity in the cylindrical element 17 is not greater than 10 cm per second.

17. The fluidized-bed reactor of claim 13 wherein the length $H_4$ of the cylindrical element 17 is 0.05 to 0.2 times the height $H_3$ of the liquid-solid separation compartment 7.

18. The fluidized-bed reactor of claim 13 wherein the cross sectional area $A_3$ of the liquid-solid separation compartment 7 is 0.4 to 3 times the cross sectional area $A_1$ of the reaction space.

19. The fluidized-bed reactor of claim 13 including a roof 19 positioned over the reaction space and wherein the diameter of the cross sectional area $A_6$ of the upperside of the roof 19 of the reaction space, which roof is separated from the truncated cone-shaped element by a channel 18 which brings about the communication between the reaction space and the liquid-solid separation compartment, is 0.5 to 0.9 times the diameter of the cross-sectional area $A_1$ of the reaction space.

20. The fluidized-bed reactor of claim 13 wherein the total height $H_5$ of the three phase separation compartment 3 is 0.4 to 2 times the diamter $D_1$ of the reaction space.

* * * * *